Nov. 5, 1929.   J. T. ROSS   1,734,829
GRAVITY MOTOR
Filed Nov. 22, 1928   4 Sheets-Sheet 1

Inventor
JAMES T. ROSS,
By Wm. D. Shoemaker
Attorney

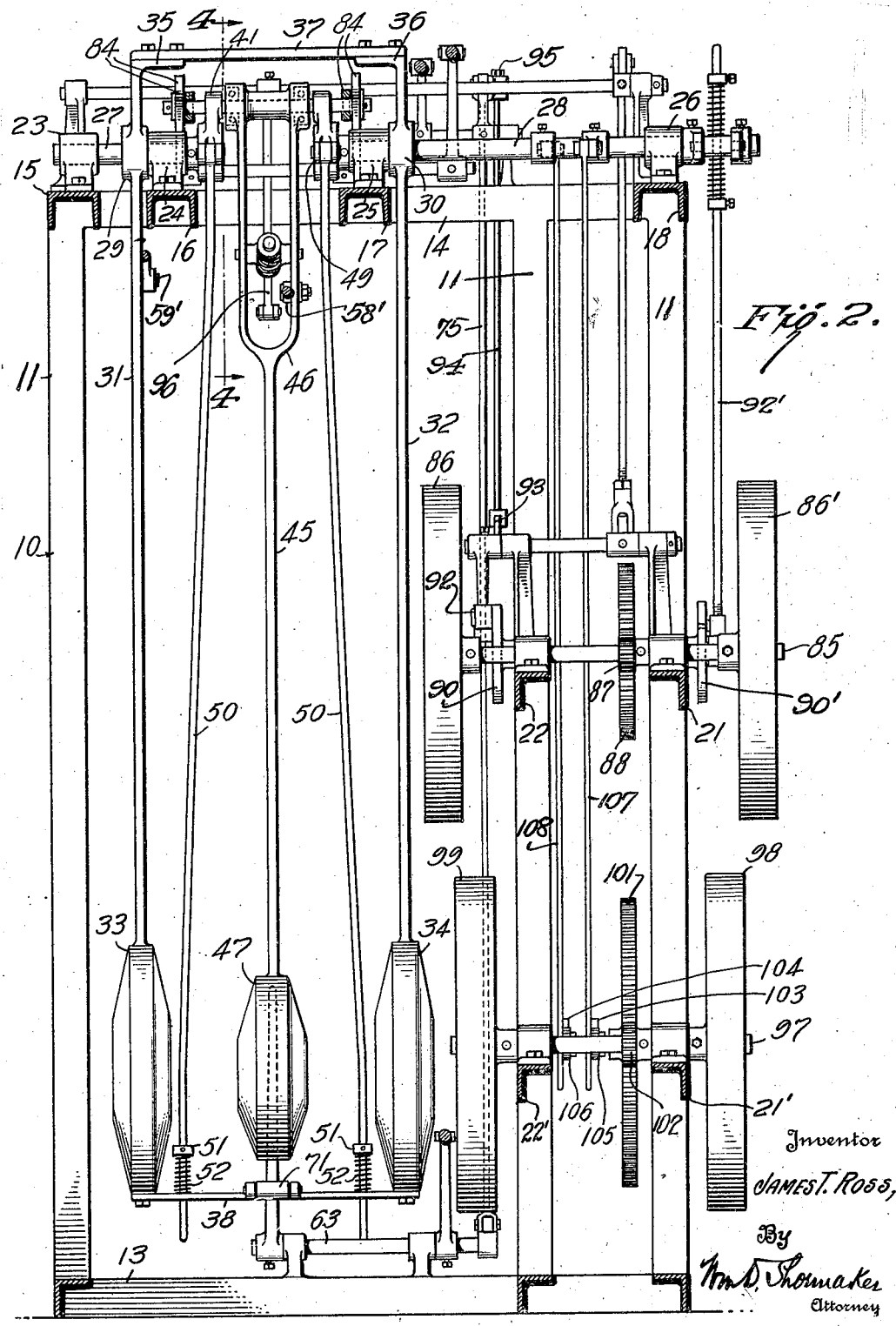

Nov. 5, 1929.  J. T. ROSS  1,734,829
GRAVITY MOTOR
Filed Nov. 22, 1928   4 Sheets-Sheet 3

Inventor
JAMES T. ROSS,
By
Wm. D. Shoemaker
Attorney

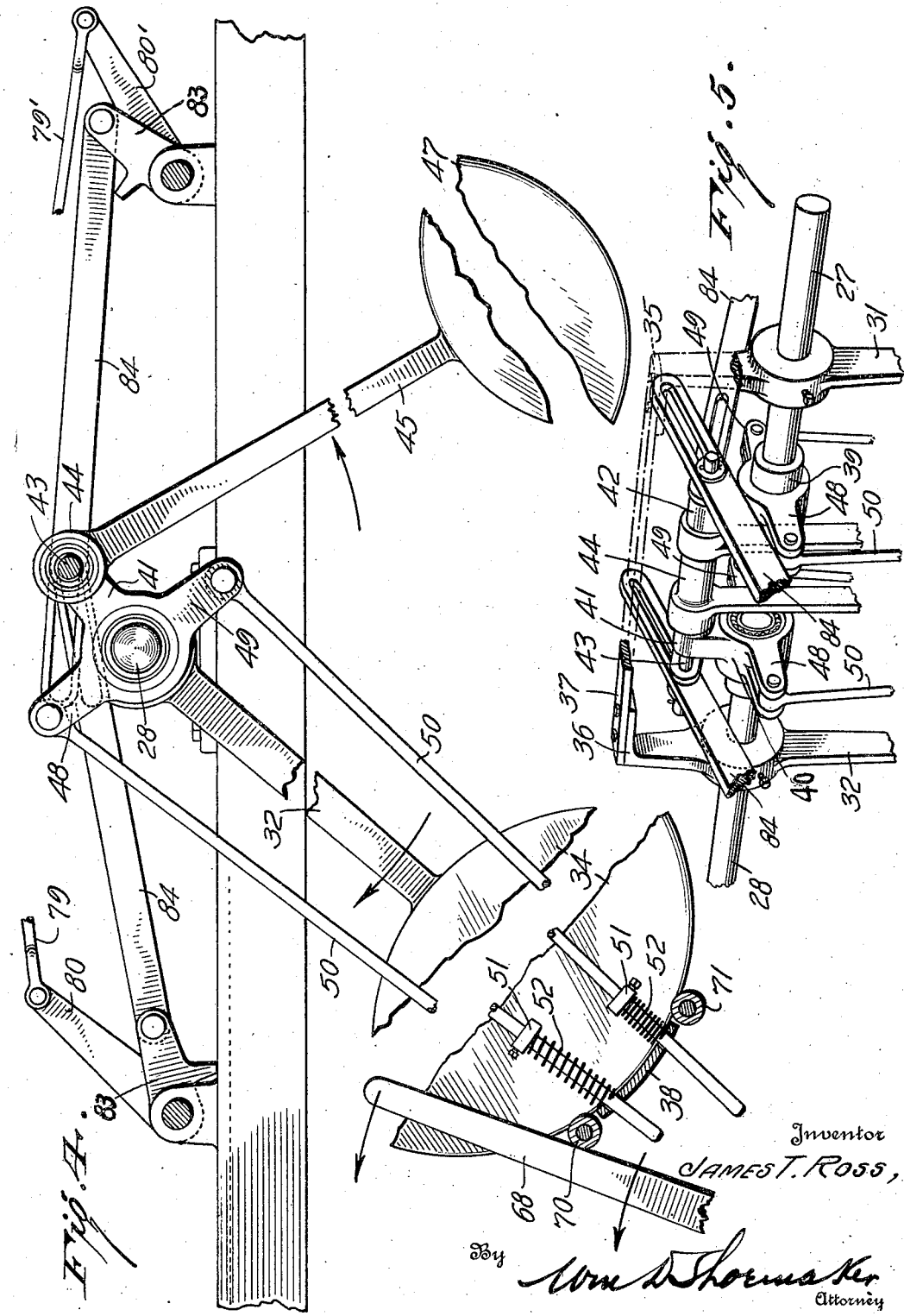

Patented Nov. 5, 1929

1,734,829

UNITED STATES PATENT OFFICE

JAMES T. ROSS, OF DUNCAN, OKLAHOMA

GRAVITY MOTOR

Application filed November 22, 1928. Serial No. 321,051.

This invention relates to a gravity motor and more particularly to such a motor comprising a plurality of energy storing elements connected to move in synchronism.

The object of the invention is to produce a mechanism by which a constant energy of a small high speed motor can be translated into an intermittent application of power through a relatively short distance without the production of shocks or jars or injury to the motor.

Another object of the invention is the production of a power transmission mechanism comprising a plurality of energy storing elements connected to move in synchronism.

A still further object of the invention is the production of a mechanical movement comprising a plurality of pendulums so mounted with relation to each other that they co-act in producing a unitary pendulum energy storage. Another object is the provision of a resetting mechanism for such a composite pendulum. Another object is the tying to such a pendulum of a fly wheel mechanism and a power take off mechanism.

Other objects and advantages of the invention will hereinafter appear in the following description and the novel features thereof will be pointed out in the appended claims.

Like letters of reference indicate like parts throughout the several figures of the drawings in which:—

Fig. 2 is a vertical section taken upon the line 2—2 of Fig. 1.

Fig. 4 is a section of a portion of the machine taken on the line 4—4 of Figure 2 with parts fore-shortened.

Fig. 5 is a perspective of the pendulum mount.

Figure 1:
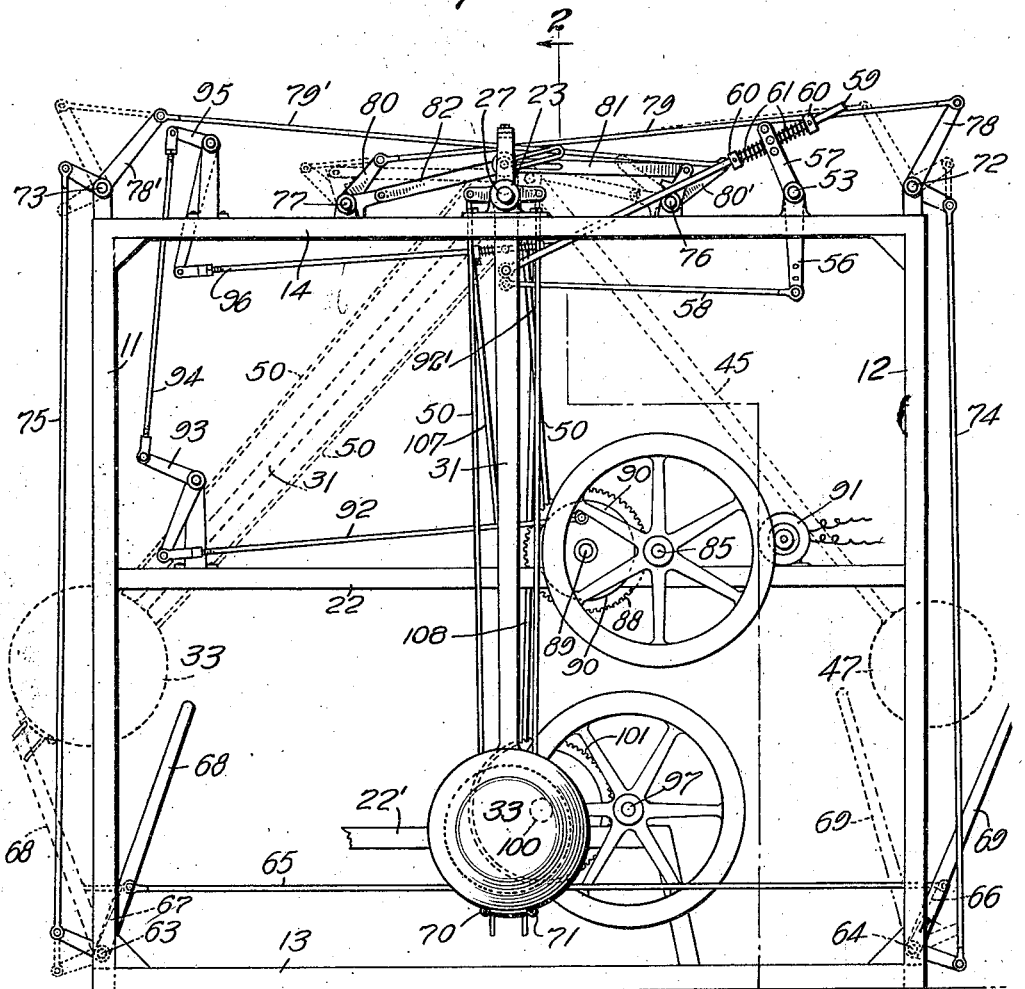
Fig. 1 is a side elevation of a machine embodying the invention.

For the purpose of description, the motor may be sub-divided into parts as follows:— A frame work for supporting the several mechanisms, a composite pendulum comprising two separate pendulum elements, a resetting mechanism for one of the pendulums, a fly wheel mechanism for taking power from the small motor, and a power take off mechanism. The several parts just enumerated will be described in detail and their individual functions pointed out after which a recital of their conjoint use will be given.

The motor is mounted in a frame work 10 of angle iron. The particular construction of the frame work is not important. Any type of frame which will support the several elements of the motor in proper relationship will answer the purposes quite as well as the frame shown. However, the frame work shown consists of uprights 11, 12 at the ends thereof, there being three of each of these uprights. They connect the usual rectangular base 13 and top 14. The top of the frame consists of four channels and these have been indicated by the numerals 15, 16, 17 and 18 connected together at the ends of the machine by the cross channels 19 and 20.

The frame just described is divided into two parts, as shown, one of which is wider and defines the space in which the composite pendulum swings, the other of which is shown as narrower, although this is immaterial, in which is mounted the fly wheels and associated parts. To provide suitable bearing supports for the said fly wheel and associated parts, the end uprights are connected together by upper and lower cross angles indicated by the numerals 21 and 21', 22 and 22', the angle irons 21' and 22' being located below the angles 21 and 22.

Upon the top channels 15, 16, 17 and 18 are mounted four bearings 23, 24, 25 and 26. In the bearings 23 and 24 is mounted a short shaft 27 while in the bearings 25 and 26 is a long shaft 28. These two shafts constitute portions of what might be termed a common shaft since they are intended to oscillate together in the operation of the machine and are in perfect alignment. On these two shafts are fixedly mounted collars 29 and 30. Suspended from said collars are pendulum arms 31 and 32 supporting weights 33 and 34. Projecting upward from the collars 29 and 30 are studs 35 and 36 to which are connected the cross brace 37. The weights 33 and 34 are also connected at the bottom by a plate 38. The several parts just described constitute a frame which connects to the short shaft 27 and the long shaft 28 and in effect forms a pendulum frame in which swings a secondary pendulum to be now described.

On the adjacent ends of the shafts 27 and 28 are mounted oscillating bearings 39 and 40, rising from which are the lugs 42 and 41. In said lugs is mounted a shaft 43 on which is the sleeve 44 free to oscillate, and mounted on said shaft by means of ball bearings. The sleeve 44 supports the auxiliary pendulum 45 comprising the yoke 46 and the weight 47.

From the oscillating bearings 39 and 40 arms project to either side and these have been indicated by the numerals 48, 49. From these arms extend four push rods 50 each of which has its lower end projecting through an aperture in the plate 38 and on each of which is mounted a collar 51 and a spring 52. The main pendulum frame is connected to the auxiliary pendulum through the medium of a rocker shaft 53 which is mounted in bearings 54 and 55 supported on the top channels 16 and 17. This rocker shaft is provided with rocker arms 56 and 57 both of which are provided with a series of openings for the adjustable attachment of connecting rods 58 and 59. The rod 59 is resiliently connected to the arm 57 by the provision of collars 60 and springs 61 confining on said rod a pivot block 62. This block is mounted in the two-part rocker arm 57 as will be appreciated.

The parts so far described in detail constitute a composite pendulum comprising a main pendulum and an auxiliary pendulum which are connected together in three different ways. First, the shafts to which the main pendulum frame is fixedly connected constitute the supports for the auxiliary pendulum in that the oscillating collars which carry the auxiliary pendulum are mounted upon the ends of said shaft. Second, the supporting collars for the auxiliary pendulum are connected to the push rods extending to the lower portion of the pendulum frame, and thirdly the rocker shaft 53 is connected to both the main pendulum frame and to the auxiliary frame, the connection to the main frame being indicated by the numeral 59' and to the auxiliary by the numeral 58'.

It will be appreciated that the shaft 43 is the pivot on which the auxiliary pendulum swings and that said shaft has a movement through an arc in the operation of the composite pendulum. This will be appreciated from Figure 4 wherein the main pendulum is shown as swinging to the left and the auxiliary pendulum to the right. This result is produced by the rocker shaft 53 and its connections to the main and auxiliary pendulums. It will also be appreciated that when the main pendulum swings to the right, the auxiliary pendulum will swing to the left.

From an inspection of Figure 4, it will be appreciated that the main pendulum frame when it is in vertical position and at rest will control the position of the auxiliary pendulum and in that position of the parts the auxiliary pendulum will be in a vertical position with its pivot shaft 43 in vertical alignment with the aligned pivot shafts of the main pendulum frame. This is due to the presence of the pusher rods 50 and the tensioning of the springs 52 at the lower portions thereof. It will be appreciated too that as soon as the main pendulum is swung slightly in either direction, the vertical balance will be destroyed and that the auxiliary pendulum will have a tendency to drop from its position of highest elevation to one of lower elevation at either side thereof. If permitted to do so, it would exert an undue effect on the pendulum as a whole but in this movement of the main pendulum a pair of springs 52 are put slightly under compresion and this compression of the springs tends to retard the falling of the auxiliary pivot shaft. The tension of the spring can be regulated to exert more or less influence against this falling and by this means a shock absorbing action is produced in the pendulum as a whole. The effect of this may be described in another way. The auxiliary pendulum in falling and placing the springs under compression has a tendency to accelerate at that time the movement of the weights of the main pendulum frame in a direction opposite to that of the swinging movement of this auxiliary pendulum.

The pendulum mechanism so far described is operable as a pendulum but in this invention there is provided what might be called a resetting mechanism for the auxiliary pendulum, that is, when the auxiliary pendulum has about reached the end of its travel in one direction, it is desirable to lift its pivot shaft so that it will occupy its central and elevated position. This at once releases the strain upon the pair of springs 52 which have been tensioned up to that time and as a consequence permits the further travel of the main pendulum without the momentum of the auxiliary pendulum, thereby placing the pendulum unit in better condition for its return movement. In the accomplishment of this operation, the opposite pair of springs 52 are placed under compression and thereby act as a shock absorber for the main pendulum and a preliminary power for its return.

The construction for accomplishing this result will now be described. At either end of the machine mounted on the base there are rock shafts 63 and 64. A connecting rod 65 extending from an arm 66 to an arm 67 mounted on the respective shafts 64 and 63 causes these two rock shafts to work in unison. On each of the rock shafts is a bumper element 68 and 69 lying in the path of the plate 38 and adapted to be swung by said plate in the movement of the pendulum as will be seen from the dotted line position of these bumpers in Figure 1.

In order to make the action a little freer, there is provided on the plate bumping rollers 70, 71. It will be appreciated that in the movement of the main pendulum frame these bumper rollers will strike the bumper elements and rock the two rock shafts in unison. The motion of these rock shafts is transmitted to counter rock shafts 72 and 73 through the medium of the links 74 and 75, respectively, and the oscillation of these two counter rock shafts is transmitted to a pair of top rock shafts 76 and 77. It will be understood that the counter rock shaft 72 has an arm 78 which is connected by the link 79 to the arm 80 mounted on the top rock shaft 77, and that the counter rock shaft 73 is provided with an arm 78' which is connected by the link 79' to the arm 80' on the top rock shaft 76.

The two top rock shafts are provided with toggle levers 81 and 82, each comprising a short arm 83 and a long arm 84. The end of the long arm has a slot therein which slot is provided for the reception of the end of the pivot shaft of the auxiliary pendulum.

The parts just described can be best seen in the detail Figures 4 and 5 wherein the ends of the shaft 43 are shown extending through the slots of the long arms of the toggle levers. It will be noticed that the shaft ends occupy the ends of the slots, in the case of one lever the inner end of the slot and in the case of the companion or opposite lever the outer end of the slot. It will be appreciated that each top rocker shaft is provided with a pair of these acting upon both ends of the pivot shaft 43.

It will be appreciated after a study of the movement of the several rocker arms and shafts that when the bumping roller at one side of the plate strikes the bumper at that side of the machine that a pair of toggle levers will be shifted so that they will act upon the ends of the pivot shaft 43 and cause it to be swung into a vertical position thereby lifting the auxiliary pendulum. This lifting of the pivot shaft, as hereinbefore explained, causes the tension to be removed from one pair of the springs 52 and placed upon the other. It will be further appreciated that for a portion of this bumper movement there is no lifting of the weight but that after it has been half completed, the weight is lifted. It will be still further appreciated that when the toggle has been operated, the pivot shaft is then locked so that it will not again exert any retrograde action upon the pendulum unit. As soon, however, as the auxiliary pendulum is swung backward through its vertical center, the toggle lever which has been heretofore operated is broken.

On the cross angles 21 and 22 is mounted a fly wheel shaft 85 on either end of which is mounted a fly wheel 86, 86'. This fly wheel shaft also carries a small gear 87 which meshes with a large gear 88 on a counter shaft 89 and this counter shaft carries at either end disks 90, 90' to which are connected eccentrically the rods 92 and 92'. A small motor 91 is mounted on the rail 20 and has a driving pulley which meshes with one fly wheel. It is the power of this small motor that is utilized and stored in the pendulum unit and to effect this result provision has been made for synchronizing the motion of the fly wheels and associated parts with that of the pendulum unit, it being understood that the pendulum unit is started manually in operation and the necessary connections made between the fly wheel units and the pendulum unit in order to obtain the synchronizing results. This is accomplished by a construction which will now be described.

One of the disks is connected through a link 92, rock lever 93, link 94, rock lever 95 and link 96 to the yoke of the auxiliary pendulum. This is accomplished, however, by means of a pivot block and elastic spring connection similar to the one hertofore described and designated by the numerals 60, 61 and 62. A detailed description of this connection is not deemed necessary.

Figure 3:
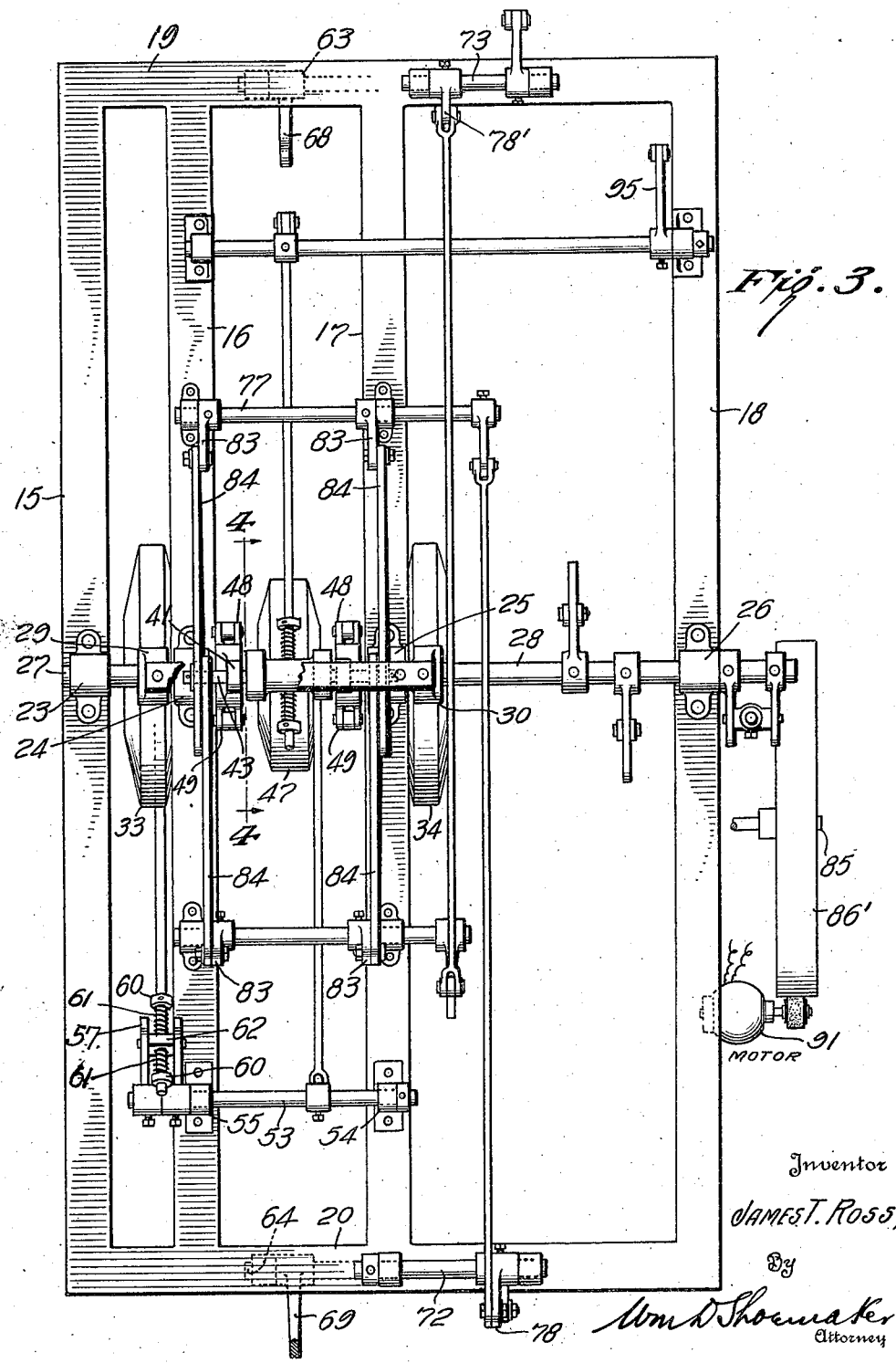
Fig. 3 is a plan.

The companion disk is connected by a similar pivot block, spring and collar elastic connection to the main or common shaft 28 shown to the right of the bearing 26 in Figures 2 and 3. It will be appreciated by the connections between the auxiliary pendulum and the fly wheel mechanism that the power of the small motor will be transmitted to the auxiliary pendulum so that the power so transferred and stored in the auxiliary pendulum is further transmitted and stored in the main pendulum. The mechanism in this case may be considered as a compound pendulum storing mechanism for power.

Figure 6:
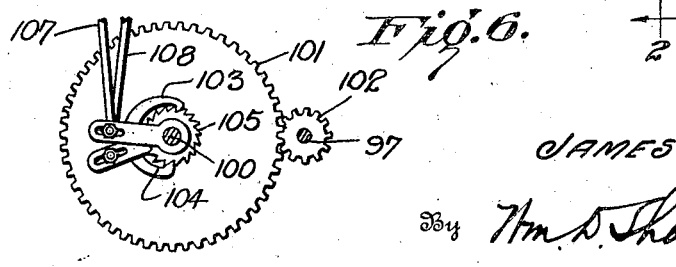
Fig. 6 is an enlarged view of the ratchets used in storing momentum.

Power may be taken off of the motor at any suitable point by any suitable mechanism but as an instance of such a mechanism I have provided a shaft 97 mounted on the rails 22' and 21' and this shaft has a pair of fly wheels at its end similar to the one above it. They have been numbered 98 and 99. Associated with this shaft is a counter shaft 100 (hidden by shaft 97 in Fig. 2 and shown in dotted lines in Fig. 1 and in full lines in Fig. 6), on which is mounted a large gear 101 meshing with a small gear 102 on countershaft 97. On the shaft 100 there are also mounted ratchet arms 103 and 104. Co-operating with ratchet wheels 105 and 106 mounted on this counter shaft, rods 107 and 108 connected to the shaft 28 by suitable arms cause the oscillations of the shaft 28 to be conveyed through these rods to the ratchet arms and hence through a suitable ratchet pawl on said arms to the ratchet wheels. It will be appreciated, therefore, that the oscillations of shaft 28 may be utilized to cause a rotary motion in the counter shaft 100 and in shaft 97. This shaft 97 may be provided with a pulley or any suitable power transmitting device found desirable.

From the description of the parts and the detailed description of their operation, the full operation of the machine should be now apparent. A brief recital, however, of its working may aid to a more complete disclosure.

The fly wheel 86' driven by the motor 91 is started and at the same time the main and the auxiliary pendulums are swung in opposite directions from the wheel 90. The fly wheel is connected to both the frame of the auxiliary pendulum and to the shaft of the main auxiliary frame. These are elastic connections and enable the full rotation of the fly wheel eccentric to take place even though there is but a slight oscillation in the auxiliary pendulum and in the main pivot shaft. Since the pendulums are synchronized with respect to each other, they will become synchronized with respect to the motor drive. It will be appreciated that with each revolution of the fly wheel energy is stored in the shaft 28 and also in the auxiliary pendulum. Since, however, the auxiliary pendulum is easier to move than the main pendulum and its shaft, the motor will act upon the auxiliary pendulum and the energy will be stepped up so to speak from the auxiliary pendulum to the main pendulum. It will now be apparent that we have three elements here, each acting upon the other, the one a small motor, the other two a main and auxiliary pendulum, and that this energy is stored in this pendulum unit and can be utilized when desired by taking it from the main pivot shaft through the ratchet mechanism described.

What is claimed is:—

1. In a gravity motor a composite pendulum comprising a main pendulum frame and an auxiliary pendulum mounted to swing within the main pendulum frame, and connections between the main pendulum frame and the auxiliary pendulum whereby the auxiliary pendulum is caused to swing always in the opposite direction from that of the main pendulum frame.

2. In a gravity motor a composite pendulum comprising a main pendulum frame and an auxiliary pendulum, the auxiliary pendulum being suspended from a pivot shaft having an arcuate path of travel about the pivot of the main pendulum frame, and connections between the main pendulum frame and the auxiliary pendulum for causing the auxiliary pendulum to travel always in a direction opposite from that of the main pendulum frame.

3. In a gravity motor a composite pendulum comprising a main pendulum frame and an auxiliary pendulum, supporting elements pivotally mounted upon the pivotal support of the main pendulum frame, projections extending upwardly and laterally from said supporting elements, a pivot shaft for the auxiliary pendulum mounted in said upward extensions, push rods pivotally secured to the lateral extensions and resiliently mounted in the main pendulum frame, and connections between the main pendulum frame and the auxiliary frame for causing the auxiliary pendulum to move always in a direction opposite to that of the main pendulum frame.

4. In a gravity motor a mount for a composite pendulum comprising two shafts in alignment, a main pendulum frame fixedly mounted upon said shafts, a pair of supporting collars mounted upon the ends of said shafts within said main pendulum frame, projections extending upwardly from said collars, and a pivot shaft for an auxiliary pendulum mounted in said projection.

5. In a gravity motor a composite pendulum comprising a main pendulum frame, supporting elements mounted on the pivot of said main pendulum frame and provided with upwardly extending projections, an auxiliary pendulum pivotally mounted in said upwardly extending projections, resilient connections between the supporting elements and the main pendulum frame causing said supporting elements to tilt during the movement of the main pendulum frame, and a resetting mechanism for bringing the pivot of the auxiliary pendulum to a position directly above the pivot of the main frame at the end of travel of the main pendulum.

6. In a gravity motor a composite pendulum comprising a main pendulum mounted upon a sectional pivotal shaft, an auxiliary pendulum mounted upon a pivotal shaft above said sectional pivotal shaft, means for giving the auxiliary pivotal shaft movement in an arcuate path and resetting means for causing the auxiliary pivotal shaft to be elevated to a position above the sectional pivotal shaft, said resetting means comprising bumpers in the path of the main pendulum frame and toggle levers actuated thereby and acting upon the auxiliary pivotal shaft.

7. In a gravity motor, a composite pendulum comprising a main pendulum, an auxiliary pendulum, connections between the main and auxiliary pendulums for causing them to swing always in opposite directions, other connections between the pivot of the auxiliary pendulum and the main pendulum shaft to resiliently maintain the auxiliary pivot shaft in a limited path of travel with respect to the pivot shaft of the auxiliary frame, and other connections between the main pendulum frame and the pivot shaft of the auxiliary frame whereby the auxiliary pivot shaft will be brought to a positon substantially above the pivot shaft of the main frame.

8. In a gravity motor the combination with a fly wheel mechanism which is driven by a small motor, of a composite pendulum consisting of a main and of an auxiliary pendulum occupying substantially the same area of operation, the fly wheel mechanism being resiliently connected to the auxiliary pendulum, the auxiliary pendulum being resiliently connected to the main pendulum.

9. The combination of claim 8 in which the auxiliary pendulum is mounted on a pivot located above that of the main pendulum and having an arcuate path of movement with respect to the pivot of the main frame.

10. The combination of claim 8 wherein the auxiliary pendulum is mounted on a pivot carried in the main pendulum frame and having a path of movement in respect to the pivot of said main frame and a resetting mechanism for bringing the pivot of the auxiliary pendulum to a vertical position at a given time in the travel of the main pendulum frame.

In testimony whereof I affix my signature.

JAMES T. ROSS.